(12) United States Patent
Ramachandran et al.

(10) Patent No.: US 6,353,302 B1
(45) Date of Patent: Mar. 5, 2002

(54) SPEED COMPUTATION FUNCTION FOR INDUCTION MOTOR/BLOWER SYSTEMS CONTROL ALGORITHM

(75) Inventors: Parimelalagan Ramachandran, Ozark, MO (US); Vincent C. Ciardo, Springfield, MO (US)

(73) Assignee: Fasco Industries, Inc., Ozark, MO (US)

( * ) Notice: Subject to any disclaimer, the term of this patent is extended or adjusted under 35 U.S.C. 154(b) by 0 days.

(21) Appl. No.: 09/691,341

(22) Filed: Oct. 18, 2000

Related U.S. Application Data
(60) Provisional application No. 60/160,365, filed on Oct. 19, 1999.

(51) Int. Cl.[7] ................................. H02P 7/36
(52) U.S. Cl. .................. 318/727; 318/432; 318/806; 318/807; 318/808; 417/42; 454/229; 454/236
(58) Field of Search .................... 318/432, 727, 318/807, 806, 808; 454/229, 236; 417/42

(56) References Cited

U.S. PATENT DOCUMENTS

| | | | | |
|---|---|---|---|---|
| 4,311,951 A | * | 1/1982 | Walker et al. | 318/778 |
| 4,726,738 A | * | 2/1988 | Nakamura et al. | 417/22 |
| 4,767,976 A | * | 8/1988 | Mutoh et al. | 318/808 |
| 4,992,715 A | * | 2/1991 | Nakamura et al. | 318/649 |
| 5,447,414 A | * | 9/1995 | Nordby et al. | 417/20 |
| 5,509,788 A | * | 4/1996 | Livington et al. | 411/43 |
| 6,227,961 B1 | * | 5/2001 | Moore et al. | 454/229 |

* cited by examiner

Primary Examiner—Robert E. Nappi
Assistant Examiner—Rita Leykin
(74) Attorney, Agent, or Firm—Jonathan A. Bay

(57) ABSTRACT

An apparatus and method for controlling an induction motor having a variable frequency drive in a blower system so that the blower system provides a specific fluid flow. A start-up program causes the motor to ramp up to approximately a predetermined steady state speed. A required blower torque is calculated by operating on a table of blower constants, a selected flow rate and a motor speed. The motor speed is calculated by operating on a table of motor specific constants, a voltage-frequency index and a measured direct current bus current. A developed motor torque is calculated by operating on a table of motor specific constants, a voltage-frequency index and the calculated motor speed. The calculated required blower torque is repeatedly compared with the calculated developed motor torque. The voltage-frequency index to the variable frequency drive is modified to force the developed motor torque to converge with the required blower torque in a steady state.

20 Claims, 1 Drawing Sheet

SPEED COMPUTATION FUNCTION FOR INDUCTION MOTOR/BLOWER SYSTEMS CONTROL ALGORITHM

CROSS-REFERENCE TO PROVISIONAL APPLICATION(S)

This application claims the benefit of U.S. Provisional Application No. 60/160,365 filed Oct. 19, 1999.

BACKGROUND OF THE INVENTION

The invention relates to a motor controller and more particularly to a motor controller for driving a fluid impeller and still more particularly to a motor controller for driving a fluid impeller to provide a specific fluid flow rate.

It is known to employ electric motors to drive fluid impellers such as fan blades or blower cages in air moving apparatus. Such apparatus are typically used in heating, ventilation and air conditioning applications.

It is further known that heating, ventilation and air conditioning systems require a, constant fluid flow in order to operate efficiently. Fluid resistance in the ducting of such systems typically varies with time as a result of various in fluid paths and duct openings, For example, every adjustment of a ventilation opening causes a fluid resistance change in the ducting.

It is known that blower torque must be adjusted to compensate for variable fluid resistance if constant fluid flow is to be maintained.

Various methods and apparatus are known to adjust blower torque in response to variations in fluid resistance or load. Typically, fluid flow may be measured directly by fluid flow transducers which are immersed in the fluid flow path. An electrical signal is typically fed back from the transducers to a microprocessor system or an electric circuit which is designed to adjust the speed of a blower motor to approach a predetermined constant value. Such systems are often too expensive or comprise components that are too large for use in practical heating, ventilation and air conditioning applications.

It is known that the magnitudes of a phase current in a blower motor drive circuit is related to the magnitude of fluid flow which is impelled by the blower. It is further known to provide a constant fluid flow by comparing a measured phase current of a blower motor drive circuit with an empirically determined ideal reference phase current for a specific constant fluid flow to determine an error phase current signal. The empirically determined reference phase current value is typically stored in a look-up table in the memory of a microprocessor system. It is further known to manipulate an error phase current signal so that it is suitable for input as an index to a pulse width modulator in a motor control circuit wherein the motor control circuit is caused to change motor speed to reduce the error phase current signal. The error phase current signal is reduced as the measured motor current approaches the ideal constant flow reference phase current.

Such methods may provide imprecise flow control because phase currents are known to fluctuate and are typically noisy. Furthermore such methods require added cost because they require current measurement feedback loops.

It is desirable to provide a constant fluid flow motor controller of reduced complexity by means not requiring direct measurement of fluid flow rate or motor current nor requiring any dedicated feedback sensor components.

SUMMARY OF THE INVENTION

Accordingly, the invention provides a specific fluid flow motor controller by employing a theoretically derived algorithm to operate on critical motor parameters internal to a variable frequency drive.

The invention determines a speed at which a motor 14 is operating pursuant to at least a second order polynomial equation, as follows:

$$N = C_{2R}I^2 + C_{1R}I + C_{0R} \quad (1)$$

wherein N is the operating speed of the induction motor at the direct current bus current I, while operating at a specific voltage and frequency and $C_{2R}$, $C_{1R}$ and $C_{0R}$ are motor constants of proportionality for the required voltage-frequency index R.

Equation (1) characterizes the steady-state control relationship between the operating speed N and the direct current bus current I. The set of constants of proportionality $C_{2R}$, $C_{1R}$ and $C_{0R}$ are specific motor constants of proportionality for the voltage-frequency index R. The size of the constant for varying R set is chosen appropriately to meet the required fineness of control.

The algorithm of the invention further another at least second-order polynomial equation, as for describing blower torque, as follows:

$$T_b = A_{2F}N_b^2 + A_{1F}N_b + A_{0F} \quad (2)$$

wherein $T_b$ is the torque required by the blower at speed $N_b$ to deliver a specific flow rate and $A_{2F}$, $A_{1F}$ and $A_{0F}$ are specific blower constants of proportionality for the required flow rate F.

Equation (2) characterizes the steady-state control relationship between the blowers speed $N_b$ and the required blower torque to deliver the desired rate of fluid flow. The set of constants of proportionality $A_{2F}$, $A_{1F}$ and $A_{0F}$ are deduced uniquely for each blower design. The size of the constant set for varying F is chosen appropriately to meet the require range of flow control.

The algorithm of the invention employs a further at least second-order polynomial equation, as for describing motor torque, as follows:

$$T_m = B_{2R}N_m^2 + B_{1R}N_m + B_{0R} \quad (3)$$

wherein $T_m$ is the torque produced by the induction motor at a speed $N_m$ while operating with a specific voltage-frequency index R and $B_{2R}$, $B_{1R}$ and $B_{0R}$ are specific motor constants of proportionality for the voltage-frequency index R.

Equation (3) characterizes the steady control relationship between an induction motor speed $N_m$ and the developed motor torque for the operating voltage-frequency index. The set of constants or proportionality $B_{2R}$, $B_{1R}$ and $B_{0R}$ are deduced uniquely for each induction motor and drive control electronics design to be used. The size of the constant set for varying R is chosen to meet the required fineness of control.

The invention employs a microprocessor system to implement a steady state control algorithm and a transient control algorithm. The transient control algorithm comprises a start-up procedure which controls the motor/blower system until it approaches a steady state condition. Under steady state conditions, $T_b = T_m$ if $N_b = N_m = N$ as when the motor is directly attached to the blower. Otherwise, the product of torque and speed for the motor is equals the product of torque and speed for the blower.

When the control system is started it executes the transient control algorithm for a start-up period. During the start-up period the microprocessor system changes the voltage-frequency index of the controller to cause the motor speed to ramp up from rest or zero rotations per minute to a desired steady state speed. The microprocessor system computes the speed value numerically by manipulating a measurement of the direct current bus current in the induction motor/blower system according to equation (1). After the start-up period, the microprocessor system executes the steady state control algorithm. The start-up period is chosen based upon the rotational inertia of the particular motor/blower system so that the speed will reach the desired steady state value before the end of the start up period.

While executing the steady state control algorithm, the microprocessor system calculates the required blower torque $T_b$ using equation (2). The microprocessor system reads a user input, typically a selector switch bank, which provides a desired fluid flow rate signal (ie., an input value for F) and selects the matching constants $A_{2F}$, $A_{1F}$ and $A_{0F}$ from memory. The microprocessor system computes the motor speed by manipulating a measurement of the direct current bus current according to equation (1). The microprocessor system calculates the required blower torque using equation (2) to operate on the selected flow constants and actual motor speed.

While executing the steady state control algorithm, the microprocessor system also calculates the developed motor torque $T_m$ by using equation (3). The motor speed is determined by manipulating a measurement of the direct current bus current according to equation (1) and the motor constants $B_{2R}$, $B_{1R}$ and $B_{0R}$ are read from memory as a function of the operating voltage-frequency index.

While executing the steady state algorithm the microprocessor system compares the computed values of $T_b$ and $T_m$ and adjusts the voltage-frequency index to force $T_b$ and $T_m$ to converge. If $T_b = T_m$ the microprocessor system makes no changes to the voltage-frequency index. If $T_b > T_m$ the microprocessor system modifies the voltage-frequency index to cause $T_m$ to increase. If $T_b < T_m$ the microprocessor system modifies the voltage-frequency index to cause $T_m$ to decrease. The microprocessor system waits for a settle time after each modification of the voltage-frequency index wherein the settle time is determined by the motor/blower system rotational inertia. The microprocessor system continuously repeats the steps of the steady state algorithm.

Again, the foregoing assumes that $N_b = N_m = N$. Also, the foregoing assumes that the main supply voltage is constant. However, the algorithm may optionally apply corrections for either, including for supply voltage variation where improved flow control resolution is required.

It is an advantage of the invention to provide a specific fluid flow rate without the need for any motor speed components and without relying on motor phase current measurements.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, the sole FIGURE is a block diagram view of a motor/blower system having an inverter fed induction motor drive, wherein the motor/blower system utilizes a control algorithm in accordance with the invention which in response to a direct current bus current measurement provides a voltage-frequency index output signal to the variable frequency motor drive to adjust motor speed.

DETAILED DESCRIPTION OF THE PREFERRED EMBODIMENTS

Figure 1:
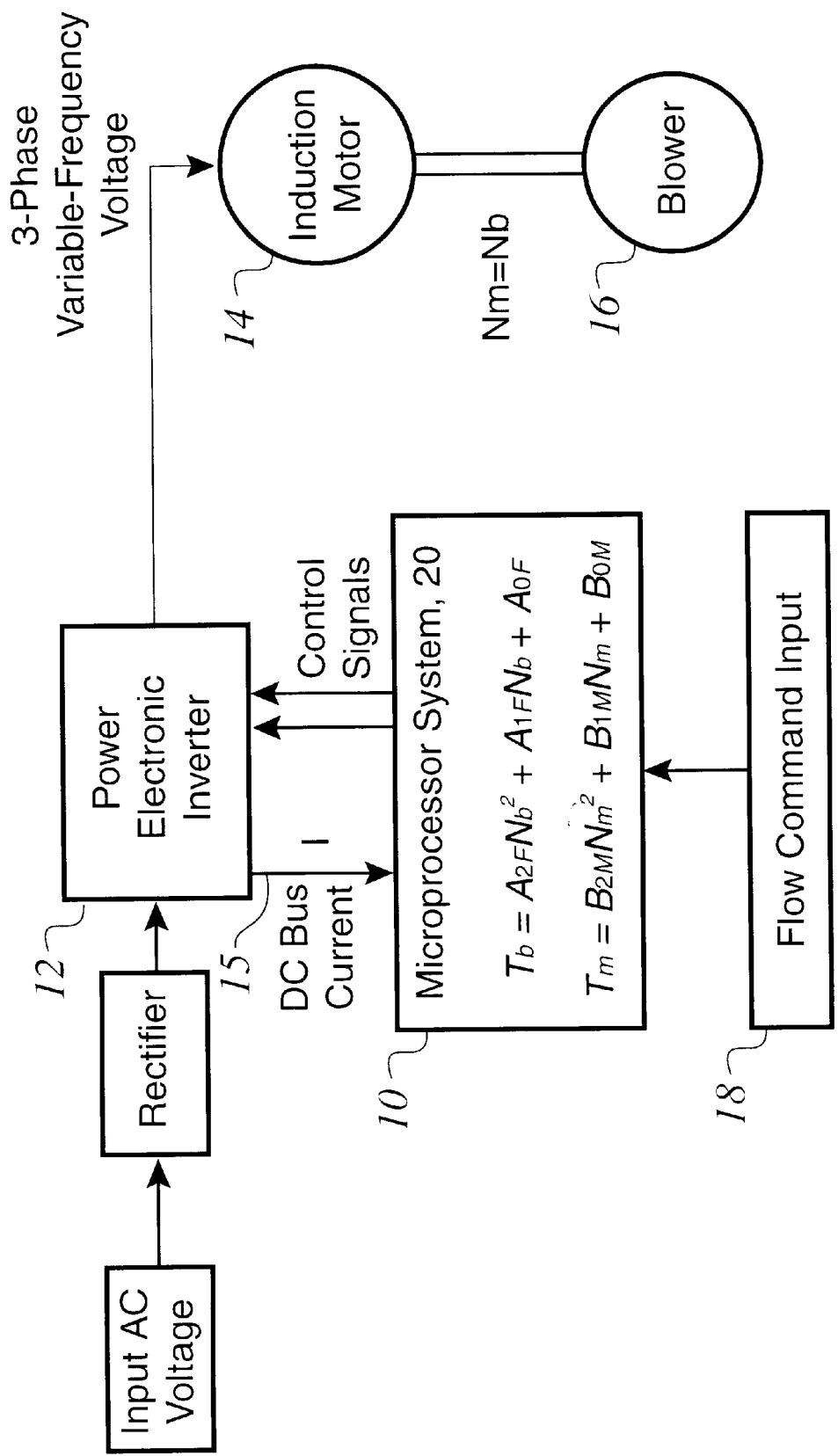

With reference to the FIGURE, The specific flow motor controller 10 of the invention comprises means for detecting a dc-bus current 15 in a variable-frequency motor drive 12 of an induction motor 14 in communication with means for signal manipulation 20, preferably a microprocessor system or digital signal processor, means for producing an electrical signal ("selector means") to represent a specific fluid flow rate, preferably a switch bank 18, in communication with the manipulation means, and memory means to store electrical signals which represent a plurality of numeric constant values. The manipulation means 20 is in electrical communication with the variable frequency drive 12 wherein the manipulation means 20 is capable of modifying a voltage frequency index to the variable frequency drive 12. In consequence, the speed of the motor 14 is changed as is the speed of the blower 16.

The control circuitry (eg., the 'manipulation means') preferably comprises a micro-device processing unit such as a microprocessor or micro-controller or the like, or else an integrated product like a digital signal processor. Generally, a microprocessor comprises a general use instruction code execution device. In distinction, a micro-controller is more of a specific use device, perhaps characterized by having a simplified instruction set and being designed to work with smaller address space than other microprocessors. These simplifications plus others that realize various input-output services that would otherwise be realized on separate chips, have the effect of reducing the total parts cost in a micro-controller system, an important consideration if the micro-device is to be designed into a manufactured product for which cost containment is paramount.

Whereas nowadays high-end micro-devices have 32-bit, 64-bit and beyond registers, there remains ample applications for highly economical 8-bit micro-devices, again especially in cases where cost is paramount. Some of the more popular 8-bit microprocessors and micro-controllers include those products of Intel and Motorola such as the Intel 8080 or Motorola's MC6800, MC6805 and/or MC68HC11. An example digital signal processor would include Texas Instrument's popular 16-bit digital signal processor, model no. TMS32024X.

Briefly, the invention involves some of the following highlights. The manipulation means executes program steps which change the voltage-frequency index of the variable frequency drive to cause a motor/blower rotational speed to ramp up from zero rotations per minute to a predetermined steady state speed within a predetermined start-up time. The steady state speed and start-up time are determined according to the rotational inertia of the particular motor/blower system and the required speed range.

An array of specific motor constant values, eg., $C_{2R}$, $C_{1R}$ and $C_{0R}$ are stored in memory wherein a specific voltage-frequency index R serves as an index to reference the proper set of constants from the array. The manipulation means reads the voltage-frequency index R from the variable frequency drive. The manipulation means reads a direct current bus current I to determine an operational speed N by manipulating or processing the following the computational scheme, which optionally is at least a second-order polynomial equation:

$$N = C_{2R} + C_{1R}I + C_{0R}.$$

In a simple case, the operational speed N corresponds to, or alternatively, is equal to not only the motor rotational speed $N_m$ but also the blower rotational speed $N_b$.

An array of specific blower constant values, eg., $A_{2F}$, $A_{1F}$ and $A_{0F}$ are stored in memory wherein a specific flow rate F serves as an index to reference the proper set of constants from the array. The specific flow rate F is determined by a selection from a selector means of a value for which the selector means provides a corresponding electrical signal.

The manipulation means processes the selected blower constant values $A_{2F}$, $A_{1F}$ and $A_{0F}$ together with the blower rotational speed $N_b$ to determine the required steady state blower torque $T_b$, as described preferably by at least a second-order polynomial equation:

$$T_b = A_{2F} N_b^2 + A_{1F} N_b + A_{0F}.$$

Another array of specific motor constant values, eg., $B_{2R}$, $B_{1R}$ and $B_{0R}$ are stored in memory wherein the specific voltage-frequency index R serves as an index to reference the proper set of constants from the array. The manipulation means processes the appropriate motor constant values $B_{2R}$, $B_{1R}$ and $B_{0R}$ together with the motor rotational speed $N_m$ to determine the steady state motor torque $T_m$ at described by preferably at least a second-order polynomial equation as follows:

$$T_m = B_{2R} N_m^2 + B_{1R} N_m + B_{0R}.$$

The manipulation means compares the computed values of $T_b$ and $T_m$ and adjusts the voltage-frequency index to force $T_b$ and $T_m$ to converge. If $T_b = T_m$ the manipulation means makes no changes to the voltage-frequency index. If $T_b > T_m$ the manipulation means modifies the voltage-frequency index to cause $T_m$ to increase. If $T_b < T_m$ the manipulation means modifies the voltage-frequency index to cause $T_m$ to decrease.

The manipulation means waits for a settle time after each modification of the voltage-frequency index wherein the settle time is determined by the motor/blower system rotational inertia. The manipulation means continuously repeats the steps of comparing $T_b$ to $T_m$ and causing the two results to converge by the modifying the voltage-frequency index.

The foregoing includes assumptions including that $N_b = N_m = N$. The following more particularly describes aspects of the invention when that is not necessarily true.

A controller is operational to implement a speed computation function for control over flow output of an induction motor/blower system. The motor/blower systems has an induction motor coupled to a blower such that a motor-torque by rotor-speed product ($T_m \times N_m$) of the induction motor substantially corresponds to a blower-torque by impeller-speed product ($T_b \times N_b$) of the blower at steady state. The ratio of rotor-speed to blower-speed ($N_m/N_b$) is known.

The control apparatus comprises a data processor and a motor drive that adjusts motor speed $N_m$ in response to control signals from the data processor corresponding to a voltage-frequency index R. Some device is provided to serve the data processor information corresponding to flow command information F. Some other device is provided to serve the data processor information corresponding to dc bus current I of the motor drive.

Wherein the data processor is operational to:
fetch the most recent voltage-frequency index R, the flow command information F, the dc bus current I of the motor drive, and the known ratio $N_m/N_b$ from either storage or inputs;
solve for rotor speed $N_m$ by a polynomial equation expanded through at least second order terms and such that the rotor-speed equation's coefficients vary with the voltage-frequency index R according to:

$$N_m = C_{0R} + C_{1R} I + C_{2R} I^2 + \ldots,$$

including extracting the rotor-speed equation's coefficients $C_{0R}$, $C_{1R}$, $C_{2R}$ . . . , from storage according to the voltage-frequency index R;
solve for impeller speed $N_b$ by the known ratio $N_m/N_b$;
solve for required blower torque $T_b$ by another polynomial equation expanded through at least second order terms and such that the blower-torque equation's coefficients vary with the flow command information F according to:

$$T_b = A_{0F} + A_{1F} N_b + A_{2F} N_b^2 + \ldots,$$

including extracting the blower-torque equation's coefficients $A_{0F}$, $A_{1F}$, $A_{2F}$ . . . , from storage according to the flow command value F;
solve for delivered motor torque $T_m$ by a further polynomial equation expanded through at least second order terms and such that the motor-torque equation's coefficients vary with the most recent voltage-frequency index R according to:

$$T_m = B_{0R} + B_{1R} N_m + B_{2R} N_m^2 + \ldots,$$

including extracting the motor-torque equation's coefficients $B_{0R}$, $B_{1R}$, $B_{2R}$ . . . , from storage according to the most recent voltage-frequency index R;
compare, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$) and,
in any case, respond to inequality by signaling the motor drive with a succeeding most recent voltage-frequency index R which is modified to adjust the motor speed correspondingly.

Optionally, the data processor is further operational to idle for a pre-determined settling time after the activities of compare and respond (if any response), and then repeat all over. As mentioned above, the data processor includes circuitry incorporating one of a micro-processor, a micro-controller, or a digital signal processor.

The step of 'responding' as following the activity of 'comparing,' in cases of the ratio $N_m/N_b$ being substantially unity, the required blower-torque (required-$T_b$) to the delivered motor-torque (delivered-$T_m$), further comprises:
not modifying the most recent voltage-frequency index R if the required blower-torque (required-$T_b$) is substantially the same as the delivered motor-torque (delivered-$T_m$);
increasing the most recent voltage-frequency index R by a given increment if the required blower-torque (required-$T_b$) is not substantially the same as and is greater than the delivered motor-torque (delivered-$T_m$); and
decreasing the most recent voltage-frequency index R by a given decrement if the required blower-torque (required-$T_b$) is not substantially the same as and is less than the delivered motor-torque (delivered-$T_m$).

Alternatively, the activity of 'responding' as following the activity of 'comparing' the product of required blower-torque by impeller-speed (required-$T_b \times N_b$) to the product of delivered motor-torque by rotor-speed (delivered-$T_m \times N_m$), further comprises:

not modifying the most recent voltage-frequency index R if the product of required blower-torque by impeller-speed (required-$T_b \times N_b$) is substantially the same as the product of delivered motor-torque by rotor-speed (delivered-$T_m \times N_m$);

increasing the most recent voltage-frequency index R by a given increment if the product of required blower-torque by impeller-speed (required-$T_b \times N_b$) is not substantially the same as and is greater than the product of delivered motor-torque by rotor-speed (delivered-$T_m \times N_m$); and decreasing the most recent voltage-frequency index R by a given decrement if the product of required blower-torque by impeller-speed (required-$T_b \times N_b$) is not substantially the same as and is less than the product of delivered motor-torque by rotor-speed (delivered $T_m \times N_m$).

The voltage-frequency index comprises a normalized ratio of voltage to frequency (V/f) that either is linear such as when an arbitrarily chosen index value of unity (R=1) corresponds to 100 V per 50 hertz and then the ratio of 200 V per 100 hertz corresponds to R=2, or is non-linear as when an arbitrarily chosen index value of unity (R=1) corresponds to 100 V per 50 hertz and then the ratio of 200 V per 90 hertz corresponds to R=2.

The step of serving the controller information corresponding to flow command information F further comprises either receiving the flow command information F from an input device or extracting it from a database.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method of implementing a speed computation function in an automatic controller of an induction motor/blower system that provides a specified flow output, comprising the steps of:

providing an induction motor/blower system having an induction motor coupled to a blower such that a motor-torque by rotor-speed product ($T_m \times N_m$) of the induction motor substantially corresponds to a blower-torque by impeller-speed product ($T_b \times N_b$) of the blower at steady state and where the ratio of rotor-speed to blower-speed ($N_m/N_b$) is known;

providing a controller linked to a motor drive that adjusts motor speed $N_m$ in response to control signals from the controller corresponding to a voltage-frequency index R;

serving the controller information corresponding to flow command information F;

serving the controller information corresponding to dc bus current I of the motor drive and solving for rotor speed $N_m$ by a polynomial equation expanded through at least second order terms and such that the rotor-speed equation's coefficients vary with the voltage-frequency index R according to:

$$N_m = C_{0R} + C_{1R}I + C_{2R}I^2 + \ldots,$$

including extracting the rotor-speed equation's coefficients $C_{0R}$, $C_{1R}$, $C_{2R}$. . . , from a database according to the voltage-frequency index R;

solving for impeller speed $N_b$ by the known ratio $N_m/N_b$;

solving for required blower torque $T_b$ by another polynomial equation expanded through at least second order terms and such that the blower-torque equation's coefficients vary with the flow command information F according to:

$$T_b = A_{0F} + A_{1F}N_b + A_{2F}N_b^2 + \ldots,$$

including extracting the blower-torque equation's coefficients $A_{0F}$, $A_{1F}$, $A_{2F}$. . . , from a database according to the flow command value F;

solving for delivered motor torque $T_m$ by a further polynomial equation expanded through at least second order terms and such that the motor-torque equation's coefficients vary with the most recent voltage-frequency index R according to:

$$T_m = B_{0R} + B_{1R}N_m + B_{2R}N_m^2 + \ldots,$$

including extracting the motor-torque equation's coefficients $B_{0R}$, $B_{1R}$, $B_{2R}$. . . , from a database according to the most recent voltage-frequency index R;

comparing, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$ and, in any case, responding to inequality by signaling the motor drive with a succeeding most recent voltage-frequency index R which is modified to adjust the motor speed correspondingly.

2. The method of claim 1 further comprising:

idling for a pre-determined settling time, and then returning to the step of serving the controller information corresponding to flow command information F, and repeating the succeeding steps.

3. The method of claim 1 wherein:

the controller includes circuitry incorporating one of a micro-processor, a micro-controller, or a digital signal processor.

4. The method of claim 1 wherein the step of responding as following the step of comparing, in cases of the ratio $N_m/N_b$ being substantially unity, the required blower-torque (required-$T_b$) to the delivered motor-torque (delivered-$T_m$), further comprises:

not modifying the most recent voltage-frequency index R if the required blower-torque (required-$T_b$) is substantially the same as the delivered motor-torque (delivered-$T_m$);

increasing the most recent voltage-frequency index R by a given increment if the required blower-torque (required-$T_b$) is not substantially the same as and is greater than the delivered motor-torque (delivered-$T_m$); and decreasing the most recent voltage-frequency index R by a given decrement if the required blower-torque (required-$T_b$) is not substantially the same as and is less than the delivered motor-torque (delivered-$T_m$).

5. The method of claim 1 wherein the step of responding as following the step of comparing the product of required blower-torque by impeller-speed (required-$T_b \times N_b$) to the product of delivered motor-torque by rotor-speed (delivered-$T_m \times N_m$), further comprises:

not modifying the most recent voltage-frequency index R if the product of required blower-torque by impeller-speed (required-$T_b \times N_b$) is substantially the same as the product of delivered motor-torque by rotor-speed (delivered-$T_m \times N_m$);

increasing the most recent voltage-frequency index R by a given increment if the product of required blower-torque by impeller-speed (required-$T_b \times N_b$) is not substantially the same as and is greater than the product of delivered motor-torque by rotor-speed (delivered-$T_m \times N_m$); and decreasing the most recent voltage-frequency index R by a given decrement if the product of required blower-torque by impeller-speed (required-$T_b \times N_b$) is not substantially the same as and is less than the product of delivered motor-torque by rotor-speed (delivered-$T_m \times N_m$).

6. The method of claim 1 wherein the voltage-frequency index comprises a normalized ratio of voltage to frequency (V/f) that either is linear such as when an arbitrarily chosen index value of unity (R=1) corresponds to 100 V per 50 hertz and then the ratio of 200 V per 100 hertz corresponds to R=2, or is non-linear as when an arbitrarily chosen index value of unity (R=1) corresponds to 100 V per 50 hertz and then the ratio of 200 V per 90 hertz corresponds to R=2.

7. The method of claim 1 wherein the step of serving the controller information corresponding to flow command information F further comprises:

one of receiving from an input device or extracting from a database the flow command information F.

8. The method of claim 1 wherein the blower has a given impeller chosen from one of a fan blade or a blower wheel.

9. Control apparatus operational to implement a speed computation function for control over flow output of an induction motor/blower system that has an induction motor coupled to a blower such that a motor-torque by rotor-speed product ($T_m \times N_m$) of the induction motor substantially corresponds to a blower-torque by impeller-speed product ($T_b \times N_b$) of the blower at steady state and where the ratio of rotor-speed to blower-speed ($N_m/N_b$) is known, said apparatus comprising:

a data processor;

a motor drive that adjusts motor speed $N_m$ in response to control signals from the data processor corresponding to a voltage-frequency index R;

a device serving the data processor information corresponding to flow command information F;

another device serving the data processor information corresponding to dc bus current I of the motor drive;

wherein the data processor is operational to:

fetch the most recent voltage-frequency index R, the flow command information F, the dc bus current I of the motor drive, and the known ratio $N_m/N_b$ from either storage or inputs;

solve for rotor speed $N_m$ by a polynomial equation expanded through at least second order terms and such that the rotor-speed equation's coefficients vary with the voltage-frequency index R according to:

$$N_m = C_{0R} + C_{1R}I + C_{2R}I^2 + \ldots ,$$

including extracting the rotor-speed equation's coefficients $C_{0R}$, $C_{1R}$, $C_{2R}$... , from storage according to the voltage-frequency index R;

solve for impeller speed $N_b$ by the known ratio $N_m/N_b$;

solve for required blower torque $T_b$ by another polynomial equation expanded through at least second order terms and such that the blower-torque equation's coefficients vary with the flow command information F according to:

$$T_b = A_{0F} + A_{1F}N_b + A_{2F}N_b^2 + \ldots ,$$

including extracting the blower-torque equation's coefficients $A_{0F}$, $A_{1F}$, $A_{2F}$... , from storage according to the flow command value F;

solve for delivered motor torque $T_m$ by a further polynomial equation expanded through at least second order terms and such that the motor-torque equation's coefficients vary with the most recent voltage-frequency index R according to:

$$T_m = B_{0R} + B_{1R}N_m + B_{2R}N_m^2 + \ldots ,$$

including extracting the motor-torque equation's coefficients $B_{0R}$, $B_{1R}$, $B_{2R}$... , from storage according to the most recent voltage-frequency index R;

compare, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$) and, in any case, respond to inequality by signaling the motor drive with a succeeding most recent voltage-frequency index R which is modified to adjust the motor speed correspondingly.

10. The apparatus of claim 9 wherein the data processor is further operational to:

idle for a pre-determined settling time after the activities of compare and respond (if any response), and then repeat all over.

11. The apparatus of claim 9 wherein:

the data processor includes circuitry incorporating one of a micro-processor, a micro-controller, or a digital signal processor.

12. The apparatus of claim 9 wherein the activity of responding as following the activity of comparing, in cases of the ratio $N_m/N_b$ being substantially unity, the required blower-torque (required-$T_b$ to the delivered motor-torque (delivered-$T_m$), further comprises:

not modifying the most recent voltage-frequency index R if the required blower-torque (required-$T_b$) is substantially the same as the delivered motor-torque (delivered-$T_m$);

increasing the most recent voltage-frequency index R by a given increment if the required blower-torque (required-$T_b$) is not substantially the same as and is greater than the delivered motor-torque (delivered-$T_m$); and decreasing the most recent voltage-frequency index R by a given decrement if the required blower-torque (required-$T_b$) is not substantially the same as and is less than the delivered motor-torque (delivered-$T_m$).

13. The apparatus of claim 9 wherein the activity of responding as following the activity of comparing the product of required blower-torque by impeller-speed (required-$T_b \times N_b$) to the product of delivered motor-torque by rotor-speed (delivered-$T_m \times N_m$), further comprises:

not modifying the most recent voltage-frequency index R if the product of required blower-torque by impeller-speed (required-$T_b \times N_b$) is substantially the same as the produce of delivered motor-torque by rotor-speed (delivered-$T_m \times N_m$);

increasing the most recent voltage-frequency index R by a given increment if the product of required blower-torque by impeller-speed (required-$T_b \times N_b$) is not substantially the same as and is greater than the product of delivered motor-torque by rotor-speed (delivered-$T_m \times N_m$); and decreasing the most recent voltage-frequency index R by a given decrement if the product of required blower-torque by impeller-speed (required-$T_b \times N_b$) is not substantially the same as and is less than the product of delivered motor-torque by rotor-speed (delivered-$T_m \times N_m$).

14. The apparatus of claim 9 wherein the voltage-frequency index comprises a normalized ratio of voltage to frequency (V/f) that either is linear such as when an arbitrarily chosen index value of unity (R=1) corresponds to 100 V per 50 hertz and then the ratio of 200 V per 100 hertz corresponds to R=2, or is non-linear as when an arbitrarily chosen index value of unity (R=1) corresponds to 100 V per 50 hertz and then the ratio of 200 V per 90 hertz corresponds to R=2.

15. The apparatus of claim 9 wherein the blower has a given impeller chosen from one of a fan blade or a blower wheel.

16. An apparatus for providing a constant fluid flow comprising:

an induction motor having at least one rotor, at least one speed sensor and at least one variable frequency drive;

at least one fluid impeller attached to said at least one rotor wherein said at least one fluid impeller is constrained to rotate with an annular velocity equal to an angular velocity of said at least one rotor;

means for calculating motor speed by manipulating a direct current bus current I wherein said means for calculating a motor speed is in electrical communication with said direct current bus current I;

means for storing and reading electrical signals to represent specific blower constants data and specific motor constant data;

means to provide an electrical signal to represent a selected fluid flow rate;

electrical signals representing an A-array of specific blower constant data wherein said A-array is indexed by an electrical signal representing a selected fluid flow rate;

means for monitoring a voltage-frequency index of said variable frequency drive;

electrical signals representing a B-array of specific motor constant data wherein said B-array is indexed by an electrical signal representing said voltage-frequency index of said variable frequency drive;

electrical signals representing a C-array of specific motor constant data wherein said C-array is indexed by an electrical signal representing said voltage-frequency index of said variable frequency drive;

means to calculate an operating speed N which is equal to a motor speed $N_m$ and a blower speed $N_b$ by reading specific motor constant data $C_{2R}$, $C_{1R}$ and $C_{0R}$ from said C-array in memory as indexed by an electrical signal representing the voltage-frequency index R of said variable frequency drive, and manipulating said direct current bus current I according to the equation:

$$N = C_2 R I^2 + C_1 R I + C_0 R;$$

means to calculate a required blower torque $T_b$ by reading specific blower constant data $A_{2F}$, $A_{1F}$ and $A_{0F}$ from said A-array in memory as indexed by said electrical signal representing a selected flow rate F and manipulating said specific blower constant data together with said blower speed $N_b$ according to the equation:

$$T_b = A_{2F} N_b^2 + A_{1F} N_b + A_{0F};$$

means to calculate a developed motor torque $T_m$ by reading specific motor constant: data $B_{2R}$, $B_{1R}$ and $B_{0R}$ from said B-array in memory as indexed by an electrical signal representing the voltage-frequency index R of said variable frequency drive, and manipulating said specific motor constant data together with said motor speed $N_m$ according to the equation:

$$T_m = B_{2R} N_m^2 + B_{1R} N_m + B_{0R};$$

means to compare the calculated values of required blower torque $T_b$ to the calculated value of delivered motor torque $T_m$:

means to modify the voltage-frequency index of the variable frequency drive to cause the delivered motor torque $T_m$ to remain constant if $T_b = T_m$;

means to modify the voltage-frequency index of the variable frequency drive to cause the delivered motor torque $T_m$ to increase if $T_b > T_m$; and means to modify the voltage-frequency index of the variable frequency drive to cause the delivered motor torque $T_m$ to decrease if $T_b < T_m$.

17. The apparatus of claim 16 further comprising means to modify said voltage-frequency index so as to cause said motor speed to increase from a specific speed approximating a steady state speed during a start-up period.

18. The apparatus of claim 16 wherein said means to calculate motor speed, means for storing and reading electrical signals, means for monitoring a voltage-frequency index, means to calculate a required blower torque, means to calculate a developed motor torque, means to compare the required blower torque with the developed motor torque, and means to modify the voltage-frequency index of a variable frequency drive comprises either a microprocessor system or a digital signal processor.

19. A method of implementing a speed computation function in an automatic controller of an induction motor/blower system that provides a specified flow output, comprising the steps of:

providing an induction motor/blower system having an induction motor coupled to a blower such that a motor-torque by rotor-speed product ($T_m \times N_m$) of the induction motor substantially corresponds to a blower-torque by impeller-speed product ($T_b \times N_b$) of the blower at steady state and where the ratio of rotor-speed to blower-speed ($N_m / N_b$) is known;

providing a controller linked to a motor drive that adjusts motor speed $N_m$ in response to control signals from the controller corresponding to a voltage-frequency index R;

serving the controller information corresponding to flow command information F;

serving the controller information corresponding to dc bus current I of the motor drive and solving for rotor speed $N_m$ by a polynomial equation expanded through at least second order terms and such that the rotor-speed equation's coefficients vary with the voltage-frequency index R according to:

$$N_m = C_{0R} + C_{1R} I + C_{2R} I^2 + \ldots,$$

including extracting the rotor-speed equation's coefficients $C_{0R}$, $C_{1R}$, $C_{2R} \ldots$ , from a database according to the voltage-frequency index R;

solving for impeller speed $N_b$ by the known ratio $N_m/N_b$;

solving for required blower torque $T_b$ by a given equation that is at least a function of a variable the impeller speed $N_b$:

$$T_b = \text{function } [N_b];$$

solving for delivered motor torque $T_m$ by another given equation that is at least a function of another variable the rotor speed $N_m$:

$$T_m = \text{function } [N_m];$$

comparing, in cases of the ratio $N_m/N_b$ being substantially unity, the required blower-torque (required-$T_b$) to the delivered motor-torque (delivered-$T_m$), otherwise the product of required blower-torque by impeller-speed (required-$T_b \times N_b$) to the product of delivered motor-torque by rotor-speed (delivered-$T_m \times N_m$) and, in any case, responding to inequality by signaling the motor drive with a succeeding most recent voltage-frequency index R which is modified to adjust the motor speed correspondingly.

20. The method of claim 19 further comprising:

idling for a pre-determined settling time, and then returning to the step of serving the controller information corresponding to flow command information F, and repeating the succeeding steps.

* * * * *